US012587318B2

(12) United States Patent
El Hamss et al.

(10) Patent No.: US 12,587,318 B2
(45) Date of Patent: Mar. 24, 2026

(54) METHODS AND APPARATUS FOR UPLINK CONTROL ENHANCEMENT

(71) Applicant: InterDigital Patent Holdings, Inc., Wilmington, DE (US)

(72) Inventors: Aata El Hamss, Laval (CA); Faris Alfarhan, Montréal (CA); Paul Marinier, Brossard (CA); J. Patrick Tooher, Montreal (CA); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 753 days.

(21) Appl. No.: 17/798,625

(22) PCT Filed: Feb. 12, 2021

(86) PCT No.: PCT/US2021/017948
§ 371 (c)(1),
(2) Date: Aug. 10, 2022

(87) PCT Pub. No.: WO2021/163554
PCT Pub. Date: Aug. 19, 2021

(65) Prior Publication Data
US 2023/0093477 A1 Mar. 23, 2023

Related U.S. Application Data

(60) Provisional application No. 63/091,653, filed on Oct. 14, 2020, provisional application No. 62/975,753, filed on Feb. 12, 2020.

(51) Int. Cl.
*H04L 1/1829* (2023.01)
(52) U.S. Cl.
CPC .......... *H04L 1/1854* (2013.01); *H04L 1/1861* (2013.01); *H04L 1/1864* (2013.01)

(58) Field of Classification Search
CPC .... H04L 1/1854; H04L 1/1861; H04L 1/1864
See application file for complete search history.

(56) References Cited

U.S. PATENT DOCUMENTS

2015/0200761 A1 7/2015 Kim et al.
2015/0304074 A1 10/2015 Seo et al.
(Continued)

FOREIGN PATENT DOCUMENTS

CN 104919744 A 9/2015
CN 107409014 A 11/2017
(Continued)

OTHER PUBLICATIONS

OPPO, "Email discussion summary of [107#55][IIOT] CG/SPS for TSC", 3GPP Tdoc R2-1913952 (Revision of R2-1912726), 3GPP TSG-RAN2 Meeting #107bis, Chongqing, China, Oct. 14-18, 2019, 37 pages.
(Continued)

*Primary Examiner* — Rhonda L Murphy
(74) *Attorney, Agent, or Firm* — Condo Roccia Koptiw LLP

(57) ABSTRACT

Methods and apparatus for uplink control enhancement in wireless communications are disclosed. In an example, a method includes receiving information related to a set of downlink SPS configurations, receiving downlink SPS transmission(s) based on the received information, determining a payload of UCI for transmission over an uplink channel, the payload comprises a set of HARQ feedback bits based on the received information, determining that at least one triggering condition for segmenting the set of HARQ feedback bits is satisfied, determining at least a portion of the set of HARQ feedback bits based on at least a downlink SPS configuration of the set of downlink SPS configurations, wherein the determined portion of the set of HARQ feedback bits corresponds to a respective subset of the
(Continued)

received downlink SPS transmission(s), and transmitting at least the determined portion of the set of HARQ feedback bits using the uplink channel.

20 Claims, 8 Drawing Sheets

(56)                 References Cited

U.S. PATENT DOCUMENTS

| | | | |
|---|---|---|---|
| 2018/0006791 A1 | 1/2018 | Marinier et al. | |
| 2018/0048432 A1 | 2/2018 | Sun et al. | |
| 2020/0044812 A1 | 2/2020 | Yang et al. | |
| 2023/0006775 A1* | 1/2023 | Lee ....................... | H04W 72/21 |

FOREIGN PATENT DOCUMENTS

| | | | | | |
|---|---|---|---|---|---|
| CN | 109565851 A | | 4/2019 | | |
| CN | 112584512 A | * | 3/2021 | ........... | H04L 5/0055 |
| CN | 112821990 A | * | 5/2021 | ........... | H04L 1/1812 |
| WO | 2019028857 A1 | | 2/2019 | | |
| WO | 2019099670 A1 | | 5/2019 | | |

OTHER PUBLICATIONS

Institute for Information Industry (III), "Discussion on DL SPS enhancements", 3gpp Tdoc R1-1909108, 3GPP TSG RAN WG1 Meeting #98, Prague, CZ, Aug. 26-30, 2019, 4 pages.
Interdigital, Inc., "UE HARQ-ACK Feedback enhancements ", 3GPP Tdoc R1-2006070, 3GPP TSG RAN WG1 #102-e, e-Meeting, Aug. 17-28, 2020, 3 pages.

* cited by examiner

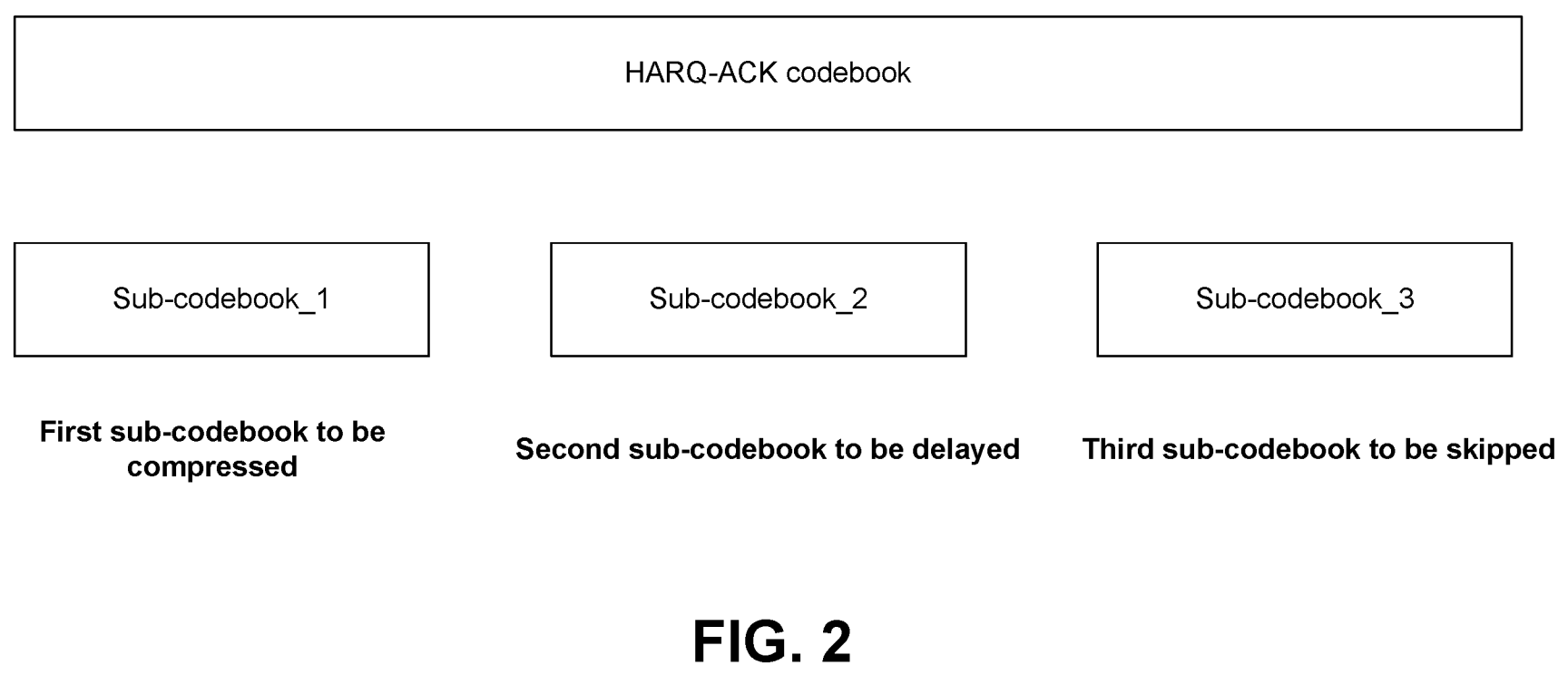

HARQ-ACK codebook

Sub-codebook_1

First sub-codebook to be compressed

Sub-codebook_2

Second sub-codebook to be delayed

Sub-codebook_3

Third sub-codebook to be skipped

FIG. 2

METHODS AND APPARATUS FOR UPLINK CONTROL ENHANCEMENT

CROSS-REFERENCE TO RELATED APPLICATIONS

This application is a U.S. National Stage Application under 35 U.S.C. 371 of International Patent Application No. PCT/US2021/017948, filed Feb. 12, 2021, claims priority to and the benefit of U.S. Provisional Application No. 62/975,753 filed in the U.S. Patent and Trademark Office on Feb. 12, 2020, and U.S. Provisional Application No. 63/091,653 filed in the U.S. Patent and Trademark Office on Oct. 14, 2020, the entire contents of each of which being incorporated herein by reference as if fully set forth below in their entirety and for all applicable purposes.

SUMMARY

Embodiments disclosed herein generally relate to communication networks, wireless and/or wired. For example, one or more embodiments disclosed herein are related to methods and apparatus for uplink control enhancement in wireless communications.

In one embodiment, a method implemented by a wireless transmit/receive unit (WTRU) for wireless communications comprises receiving information related to a set of downlink semi-persistent scheduling (SPS) configurations, and receiving one or more downlink SPS transmissions based on the received information. The method comprises determining a payload of uplink control information (UCI) for transmission over an uplink channel, and the payload comprises a set of hybrid automatic repeat request (HARQ) feedback bits based on the received information. The method also comprises determining that at least one triggering condition for segmenting the set of HARQ feedback bits is satisfied, and determining at least a portion of the set of HARQ feedback bits based on at least a downlink SPS configuration of the set of downlink SPS configurations, wherein the determined portion of the set of HARQ feedback bits corresponds to a respective subset of the received one or more downlink SPS transmissions. The method further comprises transmitting at least the determined portion of the set of HARQ feedback bits using the uplink channel.

BRIEF DESCRIPTION OF THE DRAWINGS

A more detailed understanding may be had from the detailed description below, given by way of example in conjunction with the drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein:

FIG. 2 is a block diagram illustrating an example of hybrid automatic repeat request (HARQ) feedback/HARQ codebook splitting, according to one or more embodiments;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communication Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
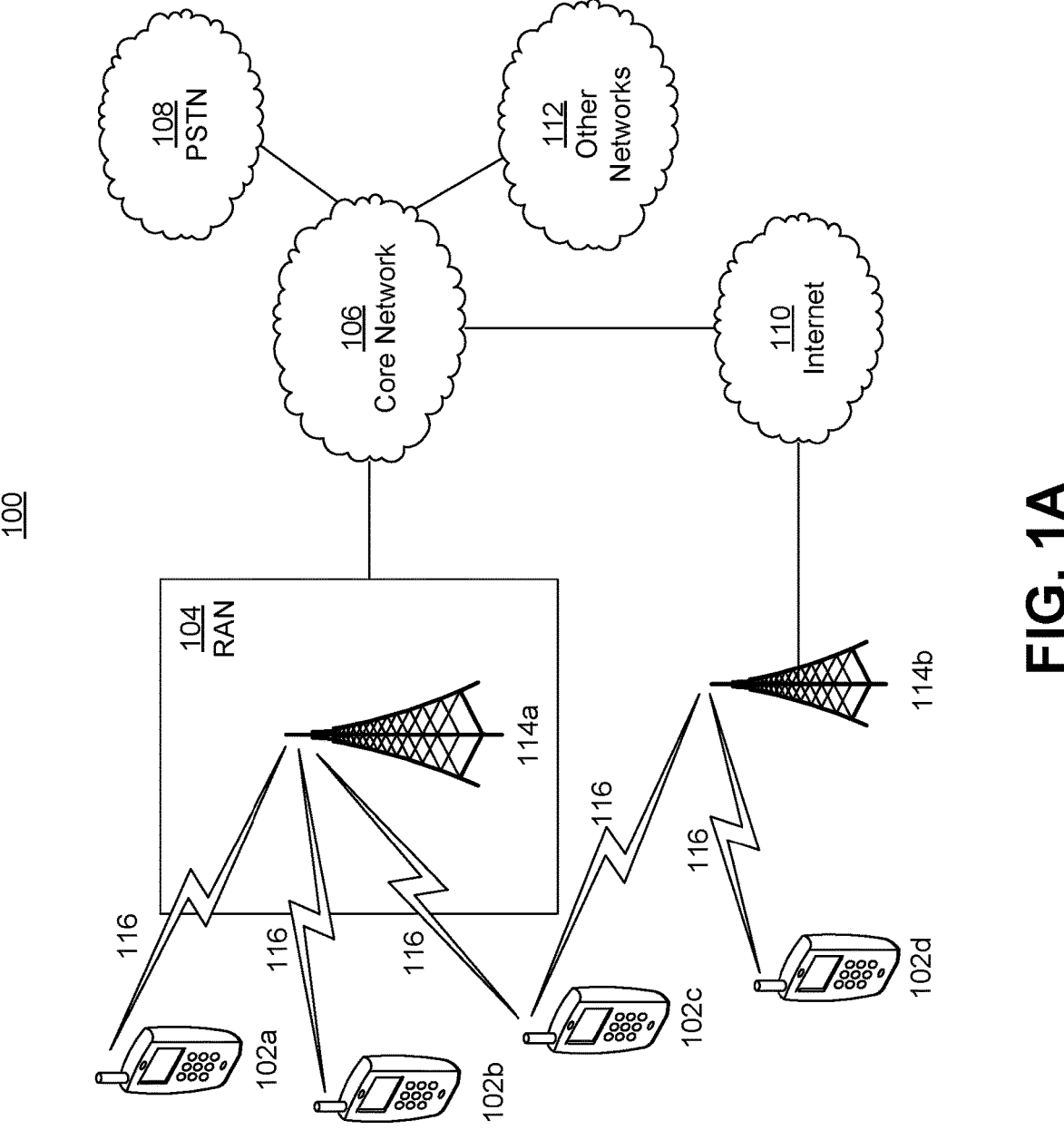
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
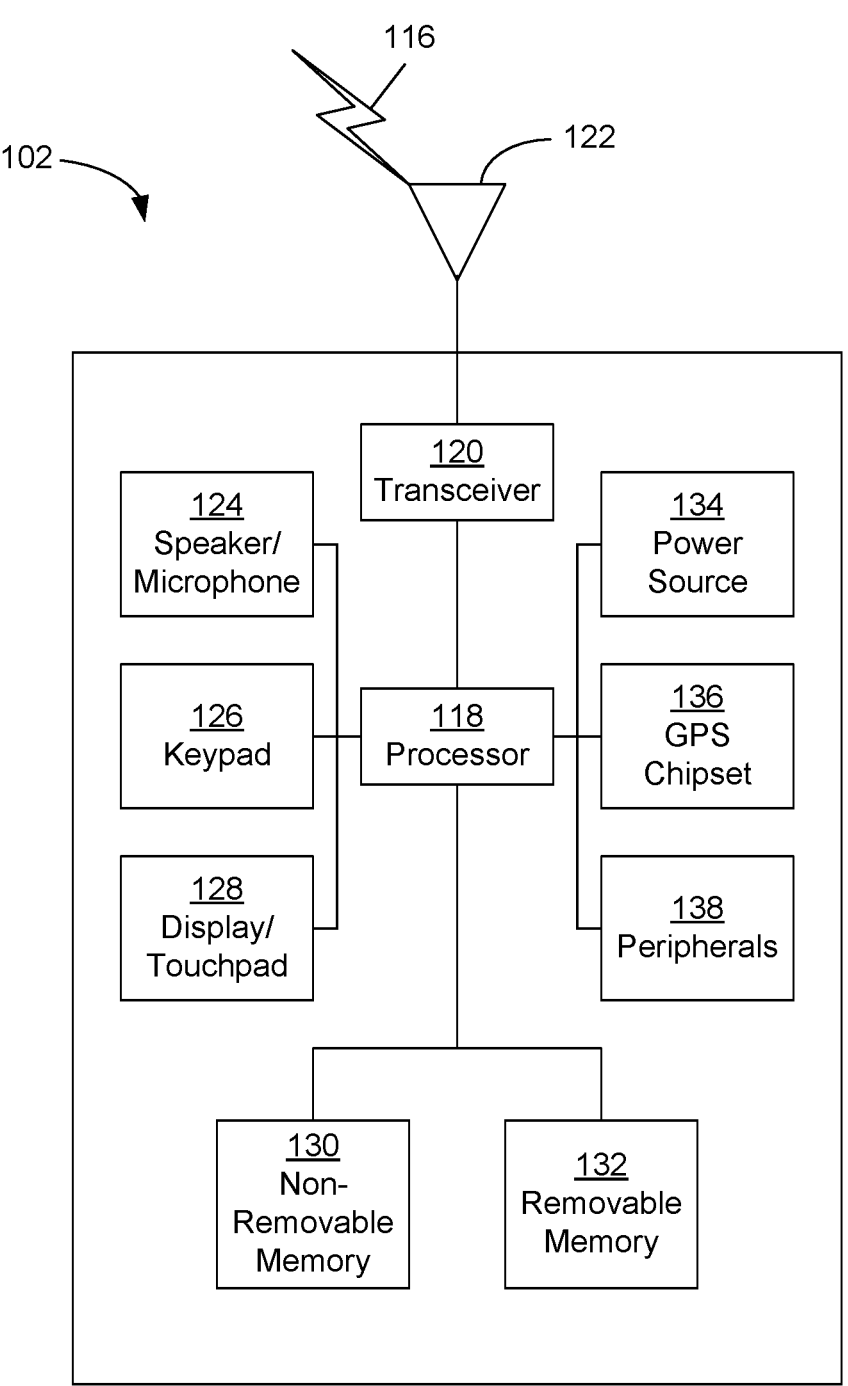
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
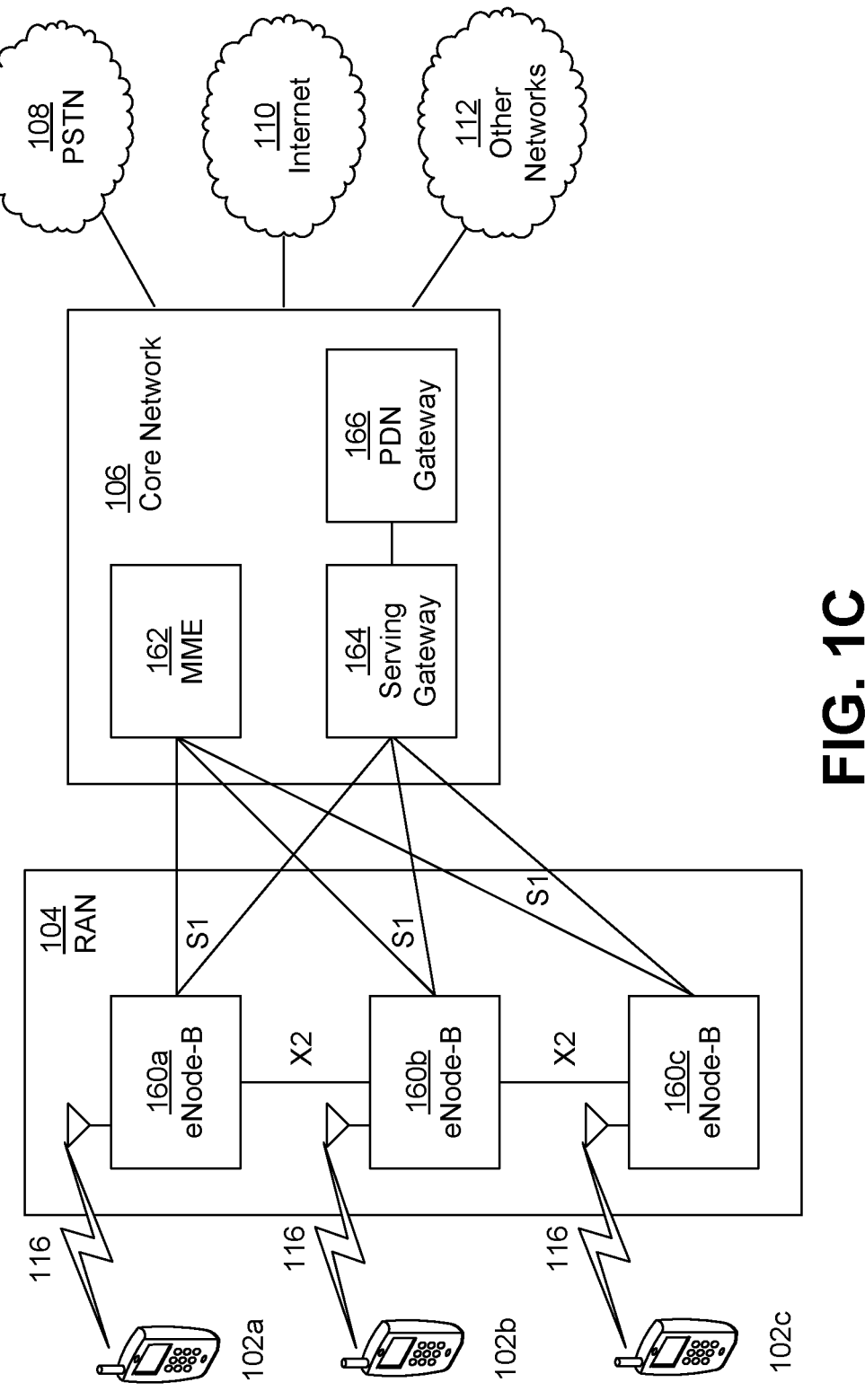
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement M IMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
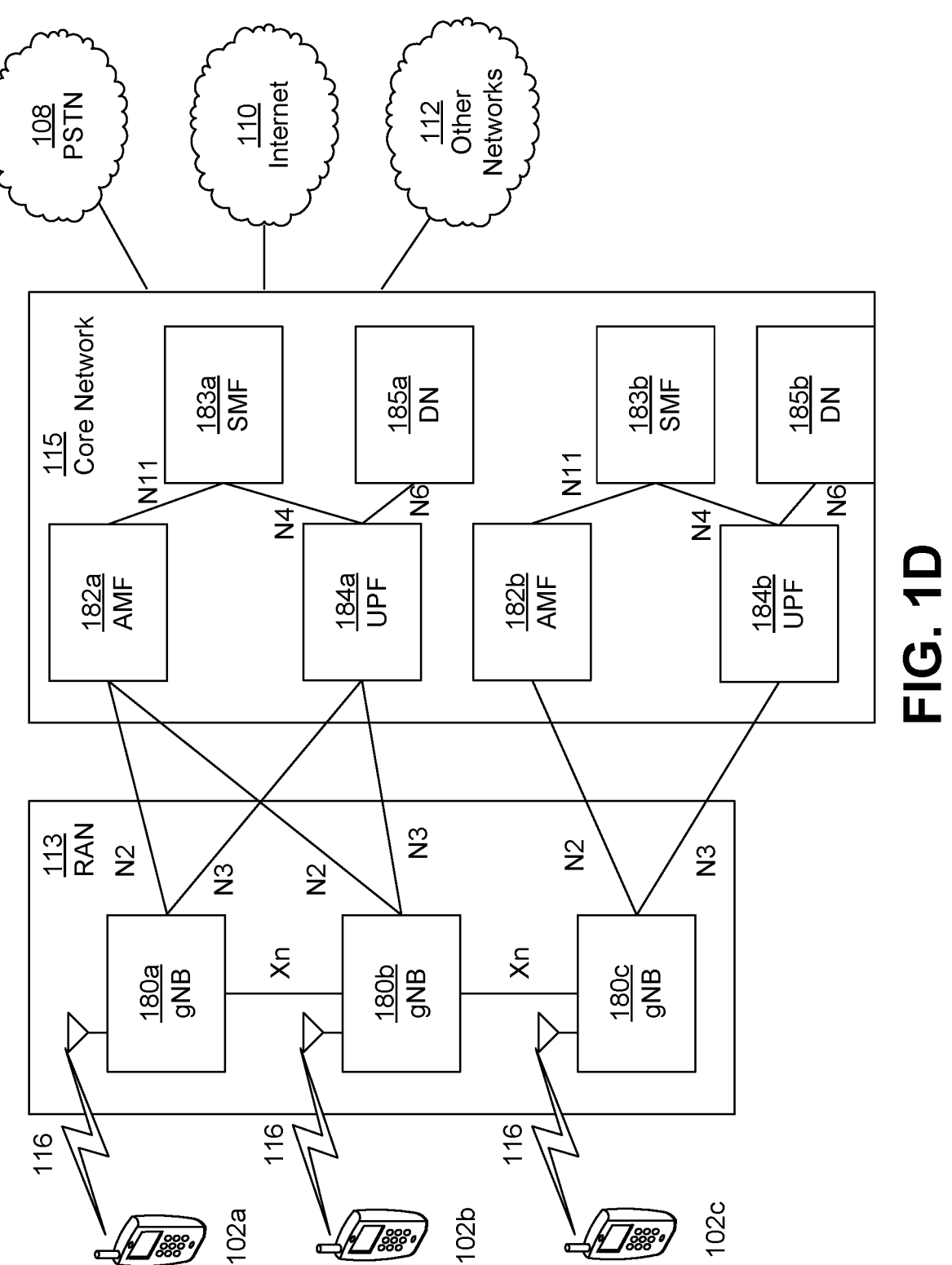
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement M IMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine-type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU or UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air (OTA) wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Embodiments disclosed herein generally relate to communication networks, wireless and/or wired. For example, one or more embodiments disclosed herein are related to methods and apparatus for uplink control enhancement (e.g., overhead reduction) in wireless communications.

New Radio (NR) technology may support and/or serve one or more services to one or multiple WTRUs. Such services may be varying and/or different latency and reliability requirements. Examples of the services that NR technology may support include URLLC and/or eMBB services. To better support operations with different types of services, such as URLLC and eMBB, mechanisms have been introduced for enabling reception of low latency certain for enabling reception of low latency and/or high reliable transmissions. The reliability, accuracy, and timeliness of feedback reports (e.g., CQI, and HARQ-ACK) may be needed to meet varying and/or different latency and reliability requirements of the various services.

NR supports one or more flexible transmission durations within a slot. NR supports semi-static resources for data transmissions on uplink (UL) and/or downlink (DL) directions. Configured grant (CG) type-1 and configured grant (CG) type-2 may be used for uplink transmissions. For CG type-1, the network may semi-statically configure an uplink grant and the WTRU may autonomously use the uplink grant without a L1 indication/activation. Configured grant (CG) type-2 is similar to CG type-1, but L1 activation is needed so that a WTRU may start using the configured grant for uplink transmissions. NR supports DL semi-persistent scheduling (SPS) resources (or DL configured grants (CGs)), including those on which the WTRU may receive DL data on active DL CGs with no scheduling necessary for each DL transport block (TB).

NR supports UL and DL services having different QoS requirements within a single WTRU, having traffic of varying latency and reliability requirements. NR supports time-sensitive communications and networking, including deterministic and non-deterministic time-sensitive networking (TSN) traffic patterns and flows, and these patterns and flows may be prevalent in factory automation settings using licensed and/or unlicensed spectrum.

In various embodiments, channel state information (CSI) may include one or more of the following: channel quality index (CQI), rank indicator (RI), precoding matrix index (PMI), an Layer 1 (L1 or PHY layer) channel measurement (e.g., reference signal received power (RSRP) such as L1-RSRP, or signal-to-interference-plus-noise ratio (SINR)), CSI-RS resource indicator (CRI), synchronization signal (SS)/physical broadcast channel (PBCH) block resource indicator (SSBRI), layer indicator (LI), and/or any other measurement quantity measured by the WTRU from configured CSI-RS and/or SS/PBCH block(s).

In various embodiments, UL control information (UCI) may include one or more of the following: CSI, Hybrid Automatic Repeat Request (HARQ) feedback for one or more HARQ processes, scheduling request (SR), link recovery request (LRR), CG-UCI, and/or other control information bits that may be transmitted on Physical Uplink Control Channel (PUCCH) or Physical Uplink Shared Channel (PUCCH).

In various embodiments, channel conditions may be or include any conditions relating to the state of a radio or a channel, and the channel conditions may be determined by a WTRU from one or more of the following: a WTRU (or UE) measurement (e.g., L1/SINR/RSRP, CQI/Modulation and Coding Scheme (MCS), channel occupancy, Received Signal Strength Indicator (RSSI), power headroom, or energy exposure headroom), L3/mobility-based measurements (e.g., RSRP, Reference Signal Received Quality (RSRQ)), an Radio Link Monitoring (RLM) state, and/or channel availability in unlicensed spectrum. Channel availability may include a determination of whether the channel being occupied based on determination of a listen-before-talk (LBT) procedure, or whether the channel being deemed to have experienced a consistent LBT failure.

There may be multiple active CGs/SPSs, multiple time-sensitive communications (TSC) traffic patterns, and/or shorter (e.g., symbol-level) SPS periodicities, and there may be plenty of HARQ feedback bits to report simultaneously, especially in time-division duplexing (TDD) mode when the DL portion is longer than the UL portion. In some cases, a WTRU may not be able to report all HARQ feedback bits (e.g., one or more pending HARQ feedback bits) in the first possible UL slot or sub-slot. Some of the HARQ processes for which the WTRU needs to report feedback may be of lower priority or tied to a service of a less stringent latency requirement. As such, uplink control enhancement such as feedback overhead reduction may be desired.

Representative Procedure for Feedback Overhead Reduction

With multiple active DL SPSs, reporting UCI (e.g., ACK/NACK feedbacks) of all active configuration(s) will increase the uplink overhead. For TDD mode of operation, the amount of resources reserved for uplink transmission(s) may not be able to support high overhead for HARQ-ACK feedbacks. For example, an IoT device or WTRU operating in TDD mode may be configured with multiple active DL SPSs for which a HARQ-ACK feedback should be reported. In various embodiments, a feedback overhead reduction procedure/mechanism may be applied for HARQ-ACK feedback for DL SPS transmissions and/or for dynamic scheduled TBs.

Representative Triggers for Feedback Overhead Reduction mechanism

In various embodiments, a WTRU may apply feedback overhead reduction (other terms may be used or interchanged, such as UCI payload reduction, UCI overhead reduction, feedback reduction, feedback overhead reduction, or feedback overhead reduction) mechanisms based on any of the following:

Any of a HARQ-ACK codebook and a UCI payload satisfying a threshold. A WTRU may be configured (statically, semi-statically and/or dynamically) with a threshold payload $N^{th}$. If the HARQ-ACK codebook satisfies (e.g., is greater than or equal to) the threshold, then the WTRU may apply the feedback overhead reduction mechanism.

A number of activated DL SPS or DL SPS configurations is above a preconfigured threshold. For example, once a WTRU is activated with a number of DL SPSs that is above the preconfigured threshold, the WTRU may apply the feedback overhead reduction mechanisms.

A received TDD configuration. In various embodiments, a WTRU may apply feedback overhead reduction mechanisms, if the WTRU receives a TDD configuration (e.g., any of a semi-static configuration and a dynamic configuration) with a number of uplink slots below a preconfigured threshold within a time window (e.g., within TDD-DL-UL transmission periodicity). In various embodiments, a WTRU may be configured with a set of slot formats indications (SFIs) that may trigger one or more feedback overhead reduction mechanisms. After the WTRU receives a group-common DCI (i.e., a DCI being intended for a group of WTRUs or all WTRUs) that indicates one of the pre-configured SFIs, the WTRU may apply one or more of the feedback overhead reduction mechanisms.

Allocated resources for PUCCH for HARQ-ACK codebook or UCI transmission(s). In various embodiments, a payload of a PUCCH resource indicated for one or more HARQ-ACK transmissions may trigger one or more feedback overhead reduction mechanisms. If the payload of an allocated PUCCH resource is below a preconfigured threshold, a WTRU may apply one or more of the feedback overhead reduction mechanisms.

Allocated resources for PUSCH for UCI or HARQ-ACK codebook. In various embodiments, a payload of a resource indicated for one or more HARQ-ACK transmissions within PUSCH (e.g., beta factor) may trigger one or more feedback overhead reduction mechanisms.

Explicit indication(s) from the network (e.g., a gNB). In various embodiments, a WTRU may receive a DCI indicating and/or activating one or more feedback overhead reduction mechanisms. The received DCI may schedule a DL transmission, provide an UL grant and/or be used for activating DL SPS/configured UL grant transmission. In various embodiments, the DCI may include any of an implicit and explicit indication that indicates and/or activates one or more of the feedback overhead reduction mechanisms. The explicit indication may be for example one or more values specifically disposed in, or coded onto, one or more bitfields of the DCI.

Active Bandwidth Part (BWP). In an embodiment, a WTRU may apply one or more feedback overhead reduction mechanisms if a default BWP is activated. A set of BWPs on which the WTRU may apply feedback overhead reduction may be configured using RRC signaling (e.g., as part of a BWP configuration). The set of BWPs may be configured using broadcast or other signaling as well. The BWP configuration may enable the network to reduce overhead on small BWPs. In various embodiments, a WTRU may apply one or more feedback overhead reduction mechanisms if the WTRU receives any of a BWP switch command and a PDSCH associated with a BWP that is different from an active BWP.

A Component Carrier (CC) on which a WTRU might be reporting HARQ-ACK feedback. In various embodiments, a WTRU may apply feedback overhead reduction mechanism on one or more licensed carriers and/or disable feedback overhead reduction mechanism on one or more unlicensed carriers. In various embodiments, a WTRU may apply feedback overhead reduction mechanism on one or more unlicensed carriers and/or disable feedback overhead reduction mechanism on one or more licensed carriers.

Channel conditions or measurements. In an embodiment, a WTRU may enable and/or disable one or more feedback overhead reduction mechanisms based on any of CSI, BLER, power headroom, exposure headroom, and RSRP measurements. The WTRU may measure channel conditions (e.g., having low SINR), and consequently enable feedback overhead reduction mechanisms (e.g., based on the measured channel conditions). In various embodiments, a WTRU may apply one or more feedback overhead reduction mechanisms if the channel condition remains the same (or satisfies a given set of channel conditions) during a time period (e.g., a time window). The time period may be configured statically, semi-statically and/or dynamically.

At least one PDSCH (e.g., one HARQ-ACK bit) meets any of the feedback reduction criteria detailed in the next section.

The WTRU may have an ongoing L2 or L3 procedure, for example, when the WTRU is performing L3 measurements, when the feedback reporting occasion is overlapping with a measurement gap, or when the WTRU has one or more ongoing beam failure recovery or beam refinement procedures.

UCI Payload Reduction

In various embodiments, a WTRU may apply one or more feedback overhead reduction mechanisms to reduce the feedback overhead. The feedback overhead reduction mechanisms may include any of UCI compression, UCI skipping, UCI splitting, and UCI delaying. In various embodiments, UCI compression may comprise HARQ-ACK codebook compression, UCI skipping may comprise HARQ-ACK bit(s) feedback skipping, and UCI delaying may comprise HARQ-ACK feedback delaying.

UCI compression/bundling

In various embodiments, a WTRU may apply HARQ-ACK codebook compression. In various embodiments, the HARQ-ACK codebook compression may be carried out using a compression function on a HARQ-ACK codebook having a size of N bits. In various embodiments, the compression function may include calculating an "AND" (logical AND) operation of all or a subset of one or more ACK/NACK bits that belong to the HARQ-ACK codebook. In various embodiments, a WTRU may be configured to calculate the "AND" (logical AND) operation of only a subset of the ACK/NACK bits of the HARQ-ACK codebook. For instance, a WTRU may calculate the "AND" (logical AND) operation of $n_1$ most significant bits of a HARQ-ACK codebook ($n_1 < N$) and may transmit 1 bit (or multiple bits that less then $n_1$ bits) instead of $n_1$ bits. This mechanism may be beneficial if the detailed ACK/NACKs feedback of only the last set of transmitted PDSCHs (e.g., the last one or more PDSCHs transmitted from the network) is needed. For example, the channel conditions during the first set of PDSCHs transmissions (e.g., the first one or more PDSCHs transmitted from the network) may be similar, therefore only the detailed ACK/NACKs feedback of the last set of transmitted PDSCHs is required.

In various embodiments, a WTRU may calculate the "AND" (logical AND) operation of $n_1$ last (or least) significant bits of a HARQ-ACK codebook ($n_1 < N$) and may transmit 1 bit (or multiple bits that less then $n_1$ bits) instead of $n_1$ bits. This mechanism may be beneficial if the detailed ACK/NACKs feedback of only the first set of transmitted PDSCHs is needed (e.g., the first one or more PDSCHs transmitted from the network). For example, the channel conditions during the last set of PDSCHs transmissions (e.g., the last one or more PDSCHs transmitted from the network) may be similar, therefore only the detailed ACK/NACKs feedback of the first set of transmitted PDSCHs is required.

In various embodiments, a WTRU may calculate an "AND" (logical AND) operation of each $n_1$ sequence of the N bits. The WTRU may compute $\lceil N/n_1 \rceil$ bits to be reported as a HARQ-ACK codebook. In various embodiments, a WTRU may report the "AND" (logical AND) operation of all the ACK/NACK bits of a HARQ-ACK codebook. The number $n_1$ may be configured semi-statically from the network, or dynamically determined based on the number of HARQ-ACK codebook N that to be reduced (e.g., the number of HARQ bits to be reduced). In various embodiments, the number $n_1$ may be a fraction of N (e.g., n1=alpha*N), and N may be dynamically changed, as a result, $n_1$ also may be dynamically changed.

In various embodiments, a WTRU may bundle HARQ feedback for multiple TBs, e.g., based on any of an associated DL resource group and time of assignment. For example, the WTRU may generate a single feedback bit per group/set of PDSCHs or TBs that belong to the same bundle. The WTRU may generate an ACK if all TBs in the bundle were successfully decoded, or NACK if at least one of the TBs in the bundle was not successfully decoded. In various embodiments, a group or set of TBs or a bundle of PDSCHs may be determined by one or more of the following:

Configuration of coupled resources. For example, RRC signaling may be used to configure the WTRU with a number of PDSCH resources (e.g., DL SPS resources) to map to a single PDSCH group.

Configuration of coupled HARQ processes. For example, RRC signaling may be used to configure the WTRU with a number of DL HARQ process IDs to map to a single PDSCH group.

Assignment time. The WTRU may bundle HARQ feedback for all TBs received in the current, past, or within the last x slots or sub-slots; whereby xis predefined or preconfigured. The WTRU may bundle HARQ feedback for all TBs that are overlapping in the time and/or frequency domain. The WTRU may bundle HARQ feedback for all TBs scheduled simultaneously (e.g., at the same instance by the same or different DCIs).

UCI Skipping

In one embodiment, a WTRU may be configured to apply UCI or HARQ-ACK feedback(s) skipping. In an example, a WTRU may skip (e.g., not report) ACK/NACK bit(s) of some (e.g., one or more) of the scheduled PDSCHs. For example, a WTRU may not transmit a subset of ACK/NACK bits of a HARQ-ACK codebook corresponding to low priority transmissions or one or more HARQ processes which were retransmitted.

UCI Delaying

In one embodiment, a WTRU may be configured to apply UCI or HARQ-ACK feedback(s) delaying. In an example, a WTRU may postpone the transmission of the ACK/NACK bit of a scheduled PDSCH. The WTRU may postpone the transmission of HARQ-ACK feedback for a subset of HARQ processes, and, for example, transmit the HARQ-ACK feedback in a different slot, sub-slot, and/or a different PUCCH Resource Indication (PRI).

UCI Splitting/Segmentation

Referring to FIG. 2, in one embodiment, a WTRU may be configured to split a HARQ-ACK codebook into multiple sub-codebooks, where some sub-codebooks may not be transmitted, or may be delayed or skipped. The WTRU may determine the HARQ-ACK codebook size for a given UCI transmission based on at least one of the following:

The number of available UCI payload(s) on PUCCH for transmission (or transmission at a certain reliability level).

The number of HARQ processes for which the WTRU is providing feedback. In an example, the number of HARQ processes may exclude any HARQ processes for which the WTRU applied feedback reduction.

The number of bits available for UCI transmission on a given PUSCH resource.

Legacy inputs (e.g., a downlink assignment index (DAI) counter, a PDSCH group index, or the number of HARQ processes, etc.).

Selection of HARQ-ACK Bits for Feedback Overhead Reduction

In various embodiments, a WTRU may be configured to select one or more HARQ-ACK bits for which UCI payload reduction can be applied. In an example, a WTRU may have received N PDSCHs to be reported within a same HARQ-ACK codebook. Based on one or more of the triggers described above, a WTRU may enable UCI payload or HARQ feedback reduction. For example, the WTRU may be configured to apply feedback reduction if at least one PDSCH (e.g., one HARQ-ACK bit) meets any of the following feedback reduction criteria. In an example, the set of PDSCHs for which the feedback being skipped, delayed, or split/compressed may be selected based on one or more of the following:

Priority associated to a HARQ-ACK or associated PDSCH transmission. A WTRU may select a set of ACK/NACK bits for which feedback overhead reduction may be applied based on the priority and/or codebook index of the HARQ-ACK or associated PDSCH transmission. For example, a WTRU may be configured to apply feedback reduction (e.g., skip or delay transmitting ACK/NACKs bits) of low priority data once the feedback reduction mechanism is enabled. The WTRU may determine the priority of the PDSCH from a priority level or index associated with the PDSCH (e.g., indicated or configured for the resource), the PDSCH resource, a property of the scheduling DCI (e.g., a priority index signaled in the DCI and/or the coreset used for scheduling).

An applicable HARQ-ACK slot/sub-slot configuration (e.g., if HARQ-ACK codebook is sub-slot-based).

For DL SPS, whether a PDSCH was transmitted or not. For example, a WTRU may be configured to determine if a PDSCH transmission was received for an activated DL SPS configuration. If PDSCH was not received, the WTRU may skip transmitting ACK/NACK feedback for that transmission. The WTRU may be configured to determine the presence and/or transmission of a SPS PDSCH based on:
  i) DMRS detection. For example, DMRS energy is less than a preconfigured threshold; and/or
  ii) Detected energy over the allocated PDSCH symbols is less than a preconfigured threshold.

For DL SPS, the periodicity of the DL SPS configuration. For example, a WTRU may be configured to delay the transmission of ACK/NACK feedback bit(s) corresponding to DL SPS configurations with high periodicity. In such case, the WTRU may have an additional opportunity indicated by the network in subsequent slot(s).

Whether PDSCH was carrying a HARQ retransmission or not. For example, a WTRU may be configured to skip or delay the transmission of ACK/NACK feedback bit(s) of retransmission(s) (or new transmissions) once the feedback overhead reduction is enabled.

The HARQ process associated with the PDSCH. For example, the WTRU may be configured by RRC signaling with a subset of HARQ processes for which the WTRU can apply feedback reduction to.

Whether the PDSCH is scheduled on a newly activated BWP and/or carrier, or a previously active BWP/carrier. In an example, the WTRU may be configured to apply feedback reduction to HARQ-ACK bit(s) associated with a newly activated BWP/carrier. In another example, the WTRU may be configured to apply feedback reduction to HARQ-ACK bit(s) associated with the last active BWP.

The MCS(s) of PDSCH(s). For example, the WTRU may be configured to apply feedback overhead reduction for HARQ process(es) associated with PDSCH(s) scheduled with a certain MCS(s), MCS range(s), and/or MCS table(s). The association may be configured by RRC signaling or predetermined. In some examples, each MCS, MCS range, or MCS table may be associated with a respective priority, a service type, a reliability level, and/or a reliability requirement.

The Transport Block Size (TBS) of the PDSCH. For example, the WTRU may be configured to apply feedback reduction for HARQ process(es) associated with the PDSCH if the TBS is larger (or smaller) than a preconfigured threshold.

Whether the PDSCH is associated with a random access procedure (e.g., a small data transmission part of MsgB).

The Radio Network Identifier (RNTI) associated with the PDSCH or used to schedule it. For example, the WTRU may be configured to apply feedback reduction for PDSCH associated with a subset of C-RNTIs or CS-RNTI.

The Transmission Configuration Indicator (TCI) state used for PDSCH;

The set of antenna ports used for PDSCH;

The Demodulation Reference Signal (DM-RS or DMRS) mapping type used for PDSCH. In an example, the WTRU may be configured to determine and/or use at least one of two or more DM-RS mapping types. The WTRU may select the HARQ ACK/NACK feedbacks to be delayed/skipped if the respective PDSCH assignments of the HARQ feedbacks have similar DM-RS mapping type.

Whether the PDSCH is related to a transmission for a multicast service and/or multicast channel. For example, for mixed mode WTRU, the WTRU may be configured to apply feedback reduction for transport channels and/or PDSCHs associated with multicast or broadcast services, physical channels, and/or resources.

The PDSCH-to-HARQ-ACK (Ki) value. For example, the WTRU may be configured to apply feedback reduction if the value of Ki satisfies a certain threshold (e.g., larger than or less than a certain threshold) or is non-numeric.

The time period since the initial transmission or start of a TB transmission/retransmission (e.g., time since the start or end of the PDSCH containing initial TB transmission or retransmission). In various embodiments, the WTRU may be configured to apply feedback reduction if the time period (e.g., since the initial transmission or the start of a TB transmission) is lower than a preconfigured threshold. In various embodiments, the WTRU may be configured to apply feedback reduction to TBs transmitted in the same Channel Occupancy Time (COT) when there are outstanding TBs from a previous COT.

Whether the PDSCH is transmitted on a DL SPS resource associated with an UL CG or a dedicated resource for HARQ feedback. For example, the WTRU may be configured with an association between one or more DL SPS resources and one or more UL CG. The WTRU may be configured to apply feedback reduction for DL TBs received on such DL SPS resources configured with such association.

In various embodiments, a WTRU may be configured to transmit HARQ-ACK feedback corresponding to a set of PDSCH(s) depending on (at least) whether the UE performs a transmission for other UCI or data in the same slot or sub-slot. For example, HARQ-ACK corresponding to a single or a set of SPS PDSCH(s), or PDSCH(s) without DCI, may be transmitted in a slot or sub-slot if HARQ-ACK corresponding to at least one PDSCH scheduled by DCI is transmitted in the same slot or sub-slot, or if the WTRU transmits PUSCH, CSI, Sounding Reference Signal (SRS), or Scheduling Request (SR) in the same slot or sub-slot, or if at least one HARQ-ACK has a specific value such as NACK (or ACK). Doing this may avoid excessive overhead and interference from PUCCH when the periodicity of SPS is very low and there is no other transmission(s) that would otherwise take place.

In various embodiments, a WTRU may be configured to transmit HARQ-ACK on PUCCH in a slot or sub-slot if at least one of the following conditions is met, and otherwise may not transmit in that slot or sub-slot:

At least one HARQ-ACK is a specific value, such as ACK (alternatively, NACK);

The type of HARQ codebook is one among a set of types, such Type 1 or Type 2;

The priority indication associated to HARQ-ACK is a certain value;

The applicable HARQ-ACK slot/sub-slot configuration (e.g., if HARQ-ACK codebook is sub-slot-based);

Whether the UL (or DL) bandwidth part was switched since transmission of PDSCH;

Within the same HARQ-ACK codebook in the same slot or sub-slot:

i) At least one HARQ-ACK bit is for a PDSCH reception scheduled by DCI;

ii) At least one HARQ-ACK bit is for SPS PDSCH release; and/or iii) At least one HARQ-ACK bit is related to PDSCH with specific value for a property, where the property may be one listed in previous paragraphs (e.g., MCS, MCS range, MCS table, number PRBs, TB size, TCI state, antenna ports, RNTI, multicast service, DMRS mapping type, etc.)

Within the same slot or sub-slot:

i) The WTRU transmits (e.g. data or CSI) on PUSCH; and/or ii) The WTRU transmits CSI, SRS, or SR (e.g., on PUCCH or PUSCH);

Determination of Skipped SPS PDSCH Transmission(s)

In various embodiments, a WTRU may be configured with one or more SPS PDSCH configurations. The WTRU may receive an SPS PDSCH activation command and may expect PDSCH transmission in the resources of the SPS PDCSH. In some cases, there may not be a PDSCH transmission in an activated SPS PDSCH resource. As such, it may be beneficial for the WTRU to identify the resources in which SPS PDSCH transmission was skipped.

A WTRU may determine whether an SPS PDSCH resource was used for a transmission. The determination may be performed by at least one of:

Reception of an RS. For example, the WTRU may assume that an SPS PDSCH is transmitted if the WTRU detects or decodes an RS, possibly associated with the transmission (e.g., a DM-RS);

Reception of a signal or channel. For example, the WTRU may assume that an SPS PDSCH is transmitted if the WTRU detects a signal that is to be transmitted in conjunction with the SPS PDSCH transmission. Such a signal may be multiplexed with the SPS PDSCH or may be received in an orthogonal set of resources. In another example, the reception of a signal may indicate to the WTRU that there is no SPS PDSCH present in the associated SPS PDSCH transmission occasion;

Reception of the SPS PDSCH, or a part thereof. For example, the WTRU may determine the presence of an SPS PDSCH based on the reception of at least a portion of the SPS PDSCH. In an example, a WTRU may detect some or all transmitted codeblocks (or codeblock groups or transport blocks). The WTRU may determine that the SPS PDSCH was transmitted independent of the outcome of the decoding process; and/or Measurement achieving a threshold. For example, a WTRU may perform a measurement (e.g., SINR) on a set of resources associated to the SPS PDSCH transmission occasion. If the measurement is above (or below) a threshold, the WTRU may determine the presence or lack thereof of an SPS PDSCH transmission.

In one embodiment, a WTRU may receive an indication confirming whether a previous SPS PDSCH transmission occasion was used for the transmission of an SPS PDSCH or not. The WTRU may receive a DAI-like signal in each SPS PDSCH. The DAI may cycle through values, and based on the value obtained in an SPS PDSCH, the WTRU may determine if a previous SPS PDSCH transmission was skipped. This may enable the WTRU to differentiate between a skipped SPS PDSCH transmission and a mis-detected SPS PDSCH transmission. In an example, the WTRU may expect the DAI to be incremented only for each actually transmitted SPS PDSCH. For any set of received SPS PDSCH transmissions, the WTRU may determine whether one or more SPS PDSCH transmissions are missing based on the order of received DAI values. In some cases, the DAI may be received as part of the SPS PDSCH transmission or may be received in another signal in resources associated to an SPS PDSCH transmission. The WTRU may determine whether an SPS PDSCH transmission is skipped, or determine the DAI of an SPS PDSCH transmission, based on at least one of the following:

An explicit indication in an SPS PDSCH transmission. For example, the DAI may be included in a DCI format (e.g., a DCI format having a small/less payload) received in a subset (e.g., a configurable subset) of resources for an SPS PDSCH transmission;

An indication included in an SPS PDSCH TB. For example, the WTRU may receive the DAI (and/or an indication) in a set of resources multiplexed with the TB. The DAI may be encoded separately from the rest of the TB;

An indication via a cyclic redundancy check (CRC). For example, the DAI value may be used in the calculation of a CRC. The WTRU may attempt to decode a TB using each of the possible DAI value(s) and determine an appropriate DAI value upon successful CRC decoding; and/or One or more DM-RS parameters. For example, a parameter of the DM-RS may be determined based on (or as a function of) the DAI value. The parameter may include any of: an RS sequence, DM-RS resources, an orthogonal cover code (OCC), and/or the like.

In one embodiment, a WTRU may receive an indication (e.g., in an SPS PDSCH) of the number of preceding skipped SPS PDSCH transmission(s). In some examples, the indication may be configured to use/apply any procedures discussed herein for a DAI reception.

In one embodiment, a WTRU may receive an indication or a value in a last SPS PDSCH transmission indicating the total number of skipped and/or un-skipped (e.g., SPS PDSCH transmission occasions used for the transmission of a PDSCH) SPS PDSCH transmission(s) in a group of SPS PDSCH transmission occasions. A group of SPS PDSCH transmission occasions may include all the occasions for which the WTRU is expected to report feedback in a same resource. In an example, the indication may be received in the resources of the last un-skipped SPS PDSCH transmission. In another example, the indication may be expected to be received in a pre-determined SPS PDSCH transmission occasion. In this case, the WTRU may receive an indication in a pre-determined (e.g., the last) SPS PDSCH transmission occasion, indicating a set of (or the total number of) skipped and/or un-skipped SPS PDSCH transmission(s) for a group of SPS PDSCH transmission occasions. The WTRU may receive the indication in the pre-determined SPS PDSCH transmission occasion regardless of whether that SPS PDSCH transmission occasion is itself skipped (or un-skipped) for the transmission of an SPS PDSCH.

HARQ-ACK Feedback when One or More SPS PDSCH Configurations are Activated

In various embodiments, a WTRU may receive an activation for one or more SPS PDSCH configurations, but not all the SPS PDSCH transmission occasions may be used for the transmission of an SPS PDSCH (e.g., skipped SPS PDSCH). The WTRU may determine the contents of a HARQ-ACK feedback associated with such an SPS PDSCH as a function of whether or not there are any skipped SPS PDSCH transmissions.

In one embodiment, a WTRU may determine whether to report HARQ-ACK feedback for one or more (skipped or un-skipped) SPS PDSCH transmission occasions (or HARQ Process(es)) based on (e.g., as a function of) at least one of:

The priority of the transmissions. For example, the WTRU may always include all HARQ-ACK feedback for all SPS PDSCH transmission occasions (e.g., regardless of they are skipped or not) for high priority SPS PDSCH configurations. In another example, the WTRU may determine whether to report HARQ-ACK for all or none, or for only un-skipped, or for only ACK, or for only NACK SPS PDSCH TBs, as a function of the priority level of the SPS PDSCH. In another example, the determination may depend on the priority of the SPS PDSCH transmission and possibly also the priority of other transmissions for which the WTRU may have to feedback HARQ-ACK in the same feedback resource. For example, if a WTRU is configured to report feedback for SPS PDSCH transmission(s) and for dynamically granted (DG) PDSCH in a single feedback report, the WTRU may determine whether to report feedback for SPS PDSCH or DG PDSCH as a function of the priorities of any of SPS PDSCH and/or DG PDSCH.

The HARQ state of the report. For example, a WTRU may report HARQ-ACK for SPS PDSCH TBs that satisfy a specific HARQ state (e.g. ACK, NACK or skipped). In an example, the WTRU may skip an entire report if all the SPS PDSCH are found to be skipped or NACK or ACK or a combination thereof. In an example, the WTRU may only report HARQ-ACK for SPS PDSCH TBs that are skipped or NACK. In such an example, the WTRU may explicitly indicate the set of SPS PDSCH TBs (or HARQ Process IDs) for which the WTRU determined to skip or NACK. In another example, the WTRU may differentiate the set(s) of HARQ Process(es) for which the WTRU determined the SPS PDSCH was skipped and those for which the WTRU determined NACK. In yet another example, the WTRU may report the set of SPS PDSCH HARQ Process(es) for which there are the smallest number of elements (either for skipped SPS PDSCH, for ACK, for NACK, or any combination thereof). For example, if the WTRU determines that in a group of five SPS PDSCH occasions there are one skipped and four ACKs, the WTRU may report the HARQ Process ID of the one skipped. In some cases, the WTRU may bundle skipped SPS PDSCH transmission(s) and/or NACKs in one group.

The type of PDSCH for which the report includes feedback. For example, the WTRU may determine whether the report includes feedback for SPS PDSCH, DG PDSCH or a combination thereof. In an example, the WTRU may determine the set of SPS PDSCH HARQ processes for which the WTRU may report HARQ-ACK feedback, based on whether the report including HARQ-ACK reports for DG PDSCH HARQ processes or not. For example, the WTRU may (e.g., may only) drop a HARQ-ACK report in its entirety if the HARQ-ACK report only includes reports for SPS PDSCH HARQ processes. The determination may also depend on whether a report resource is configured to report for one or more SPS PDSCH configurations; and/or Based on a counter obtained from the network (e.g., a gNB). As described herein, a WTRU may receive an indication (e.g., from a gNB) indicating the total number of un-skipped SPS PDSCH transmissions in a group of SPS PDSCH transmission occasions. The WTRU may determine the set of HARQ Processes for which to provide HARQ-ACK feedback based on the indicated counter value. For example, if the counter value matches with the WTRU's understanding of the total number of un-skipped SPS PDSCH transmissions, the WTRU may report HARQ-ACK for the un-skipped SPS PSCH HARQ processes, or may determine whether to transmit or drop the HARQ-ACK feedback altogether based on one or more methods/procedures described herein. In another example, if the counter value does not match with the WTRU's understanding of the total number of un-skipped SPS PDSCH transmissions, the WTRU may report HARQ-ACK feedback for all SPS PDSCH HARQ Processes (e.g., using NACK for SPS PDSCH transmissions that deemed as skipped). In some cases, the WTRU may receive an indication indicating that all SPS PDSCH transmissions in a group were skipped. In such a case, the WTRU may transmit an ACK for that indication or may skip the feedback report altogether.

Indication of a HARQ-ACK Codebook Size

In various embodiments, a WTRU may report/feedback all, or a subset, or none of the HARQ-ACK feedback for SPS or DG PDSCH transmissions. In some cases, this may lead to different HARQ-ACK codebook sizes. To ensure the WTRU and network (e.g., gNB) have common understanding of the HARQ-ACK codebook size(s), the WTRU may receive an indication (e.g., from a gNB) of the expected codebook size prior to a feedback report.

In one embodiment, a WTRU may determine the set of HARQ Processes for which to give feedback (e.g., as per rules described herein). The WTRU may determine the size(s) and content(s) of the HARQ-ACK codebook and may indicate the determined information (e.g., the size(s) and/or content(s)) to the gNB. For example, a HARQ-ACK feedback may include a set of bits indicating the size of the codebook or the contents of the codebook (e.g., NACKs, or ACKs, or skipped PDSCH or SPS PDSCH or DG PDSCH, or any combination thereof).

In one embodiment, a WTRU may determine the number of un-skipped SPS PDSCH transmission(s). The WTRU may use a dynamic codebook (e.g., one that includes feedback for a subset of all the possible SPS PDSCH HARQ Processes), if the WTRU confirms that its determination of number of un-skipped SPS PDSCH is correct (e.g., via signaling from the gNB). The WTRU may use a semi-static codebook, if the WTRU confirms that its determination of the number of un-skipped SPS PDSCH transmission(s) is incorrect.

Representative Procedure for HARQ-ACK Codebook Compression

Codebook Segmentation—Selective Transmission of Segments

In various embodiments, a WTRU may be configured to (or predefined to) divide a determined total undivided codebook size (e.g., by legacy rules, for semi-static or dynamic codebook(s)). The WTRU may be configured with a segment size (e.g., n bits). In an example, the WTRU determines the total undivided codebook size (e.g., size N), and may be based on a semi-static or dynamic codebook (e.g., in case of legacy WTRU behavior).

Figure 3:
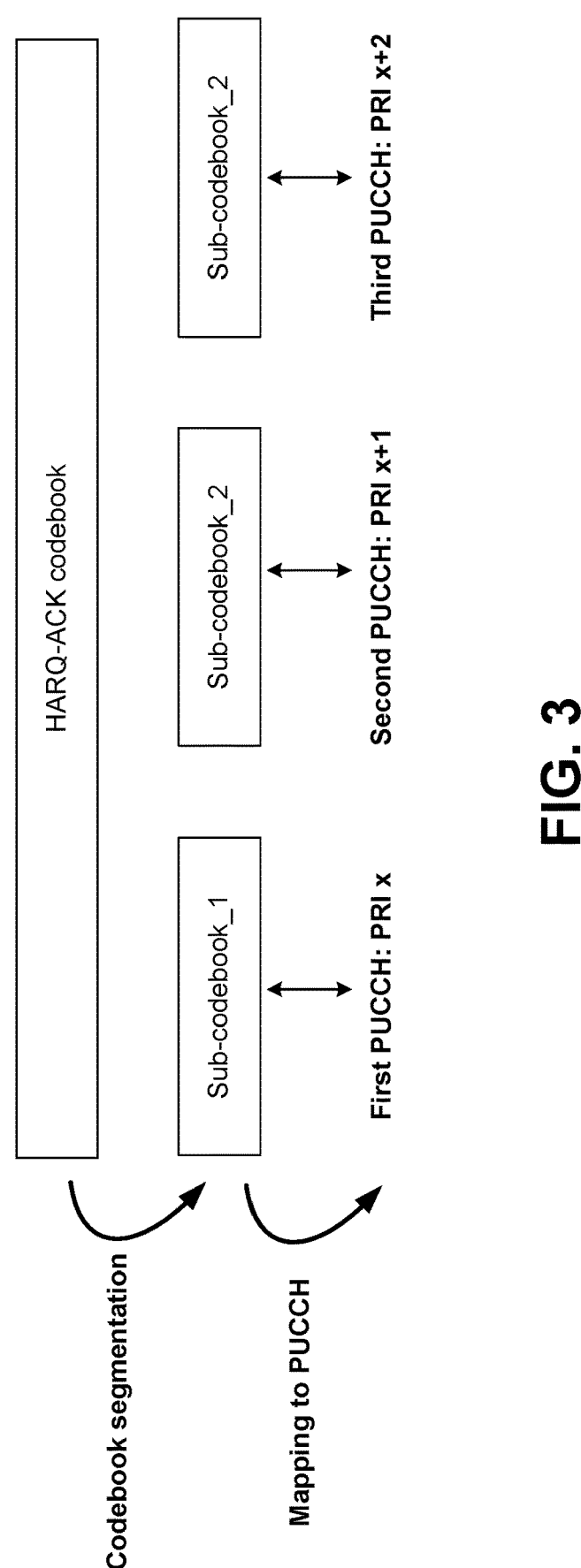
FIG. 3 is a block diagram illustrating an example of HARQ feedback/HARQ codebook segmentation and mapping to different Physical Uplink Control Channel (PUCCH) resources, according to one or more embodiments.

Referring to FIG. 3, in one embodiment, a WTRU may be configured to divide the total HARQ codebook into ceil(N/n) segments. In some examples, the WTRU may be configured (or predefined) with a mapping between one or more segment and one or more PRIs. For example, as shown in FIG. 3, the WTRU may map the first segment to PRI x, the second segment to PRI x+1, and so on. The WTRU may transmit codebook segments on one or more PRIs that map to the segment. For example, the WTRU may send the total codebook on n PRIs. The receiver may implicitly determine which codebook segment was transmitted (e.g., the segment index) from the PRI on which the segment is received.

Figure 4:
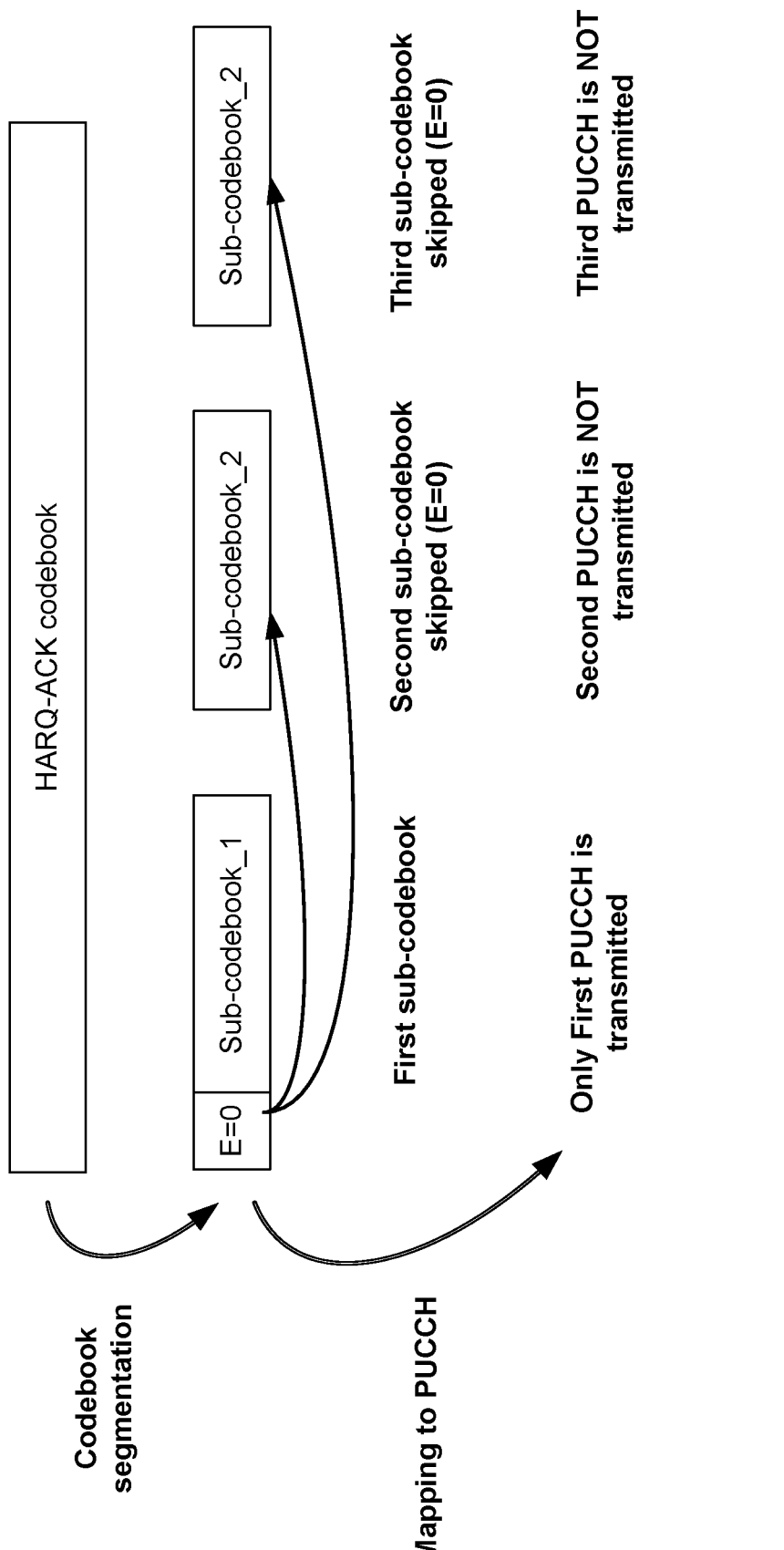
FIG. 4 is a block diagram illustrating an example of HARQ feedback/HARQ codebook segmentation and skipping indication using an extension bit, according to one or more embodiments.

Referring to FIG. 4, in one embodiment, a WTRU may be configured to transmit a subset of the codebook segments. The WTRU may decide to skip a subset of n segments, for example, determine not to transmit feedback for the skipped subset of codebook segments. For example, the UE may skip transmitting remaining segments, and/or configure/set the extension bit to 0, if the remaining LSB HARQ-ACK bits are all ACKs or all NACKs. In another example, the WTRU may skip transmission of segments that are all NACKs or all ACKs in general, as the receiver may determine the segment index from a mapped PRI. For each segment, the WTRU may include an extension bit (or a concatenation indication bit), which indicates to the receiver whether more segments are expected or would be skipped for this codebook. The extension bit can also be understood as a termination bit by the receiver, for example, to indicate to the receiver whether the segment is the last transmitted segment or not.

In an example, the extension bit can indicate to the receiver that all previous segments were skipped (e.g., not transmitted), because all HARQ feedback bits are, for instance, all ACKs or all NACKs. In another example, the extension bit can indicate to the receiver that all other segments were skipped (e.g., because all HARQ feedback bits are all ACKs or all NACKs).

In various embodiments, the WTRU may be further configured to bundle or aggregate HARQ feedback per segment to generate a single bit per segment. For example, the WTRU may be configured to generate an ACK bit if all bits in the segment are ACKs, or a NACK bit if at least one bit in the segment is NACK. In this example, the codebook size is determined or defined as n.

Restricted HARQ Feedback on Associated UL Resources

In various embodiments, the WTRU may be configured with an association between one or more DL resources or HARQ processes and a physical channel (e.g., PUCCH or PUSCH) and/or certain uplink resources. The WTRU may be configured with an association between one or more DL SPS resources and one or more UL CG. In an example, the WTRU may generate HARQ feedback only on the associated UL resources for feedback reporting.

For example, the WTRU may be configured by RRC signaling with a mapping between SPS resources 1 and 2 and CG1. For an uplink slot within a TDD frame that contains both CG1 and a PUCCH resource, the WTRU generates HARQ feedback for all HARQ processes associated with DL SPS 1 and 2 as UCI on PUSCH transmitted on CG1, and generates a HARQ feedback codebook for other processes (e.g., HARQ Process IDs (PIDs) for other SPS resources or other dynamic DL assignments) for transmission on the PUCCH resource(s).

Codebook Element Grouping

In various embodiments, the WTRU may be configured to indicate the set of transmitted or skipped HARQ-ACK feedback bits by including indices (e.g., within the codebook). In an example, an index may be used (e.g., by the WTRU) to point to a group of HARQ-ACK feedback bits (e.g., a group of HARQ processes). In this example, the granularity with which a WTRU may skip HARQ-ACK feedback bits may depend on the number of elements in each group of HARQ-ACK feedback bits.

In some examples, the HARQ-ACK groups may be configurable. The HARQ-ACK groups may be constructed by the WTRU based on a pre-defined rule. The grouping rule may be defined by at least one of:

Priority of the PDSCH. For example, each group may be composed of feedback bits for PDSCH of the same, or similar, priority.

Transmission parameter(s) of the PDSCH. For example, each group may be composed of feedback bits for PDSCH using the same beam-pair (e.g., Quasi-collocated or QCL to the same RS, which means experiencing the same channel variation or similar characteristics of the channel variation), or using the same time or frequency resource, or using the same MCS, or using the same transmitting TRP, or using the same DM-RS.

Feedback value. For example, a group may be composed of elements for which the same HARQ-ACK value is reported. A first group may be composed solely of HARQ Processes for which a NACK is reported, and a second group may be composed solely of HARQ Processes for which an ACK is reported.

Timing of the PDSCH transmission(s). For example, a group may be composed of feedback values for adjacent PDSCH transmissions. Therefore, groups may not correspond to PDSCH transmissions that overlap in time.

Size. A group may have a maximum size or a minimum size.

In some cases, the index used by the WTRU to report the HARQ-ACK feedback of a group may identify the elements in the group, and may be determined as a function of the ID(s) of the elements in the group. For example, a WTRU may be configured to provide HARQ-ACK reports only for acknowledged (ACKed) HARQ process(es). In this example, the WTRU may construct a group index as a function of the indices of the processes for which ACK is to be reported. The WTRU may need to only report such group index in the codebook. In another example, the WTRU may be configured to determine two groups, a first group for processes that are associated with ACKs and a second group for processes associated with NACKs. The WTRU may report feedback only for the group with the fewer or fewest elements. The WTRU may construct a group index as a function of the elements of the smaller group and may indicate in the codebook whether that group is for ACK(s) or for NACK(s).

WTRU behavior when dropping HARQ-ACK feedback

Based on any method or mechanism described herein, the WTRU may not report HARQ-ACK feedback for all its active HARQ processes. As such, the UE may drop the feedback report bits and behave as though it indicated NACK to the network (e.g., gNB).

In one embodiment, the WTRU may keep the feedback report bits and transmit them at a later time. For example, The WTRU may keep the set of unreported feedback bits and may transmit them on a subsequent applicable resource (e.g., a subsequent PUCCH resource).

In another embodiment, the WTRU may create a group (e.g., a PDSCH group) for all the feedback bits that were not (or not yet) transmitted in the expected feedback resource. The WTRU may maintain such a group and may transmit the applicable feedback in a special feedback resource configured for such a group. Alternatively, the WTRU may associate such a group with a pre-configured group ID (e.g., a PDSCH group ID) and may transmit the feedback for the group when triggered by the gNB. The WTRU may expect such a trigger to provide feedback resources, and the trigger may also include the pre-configured group ID.

Figure 5:
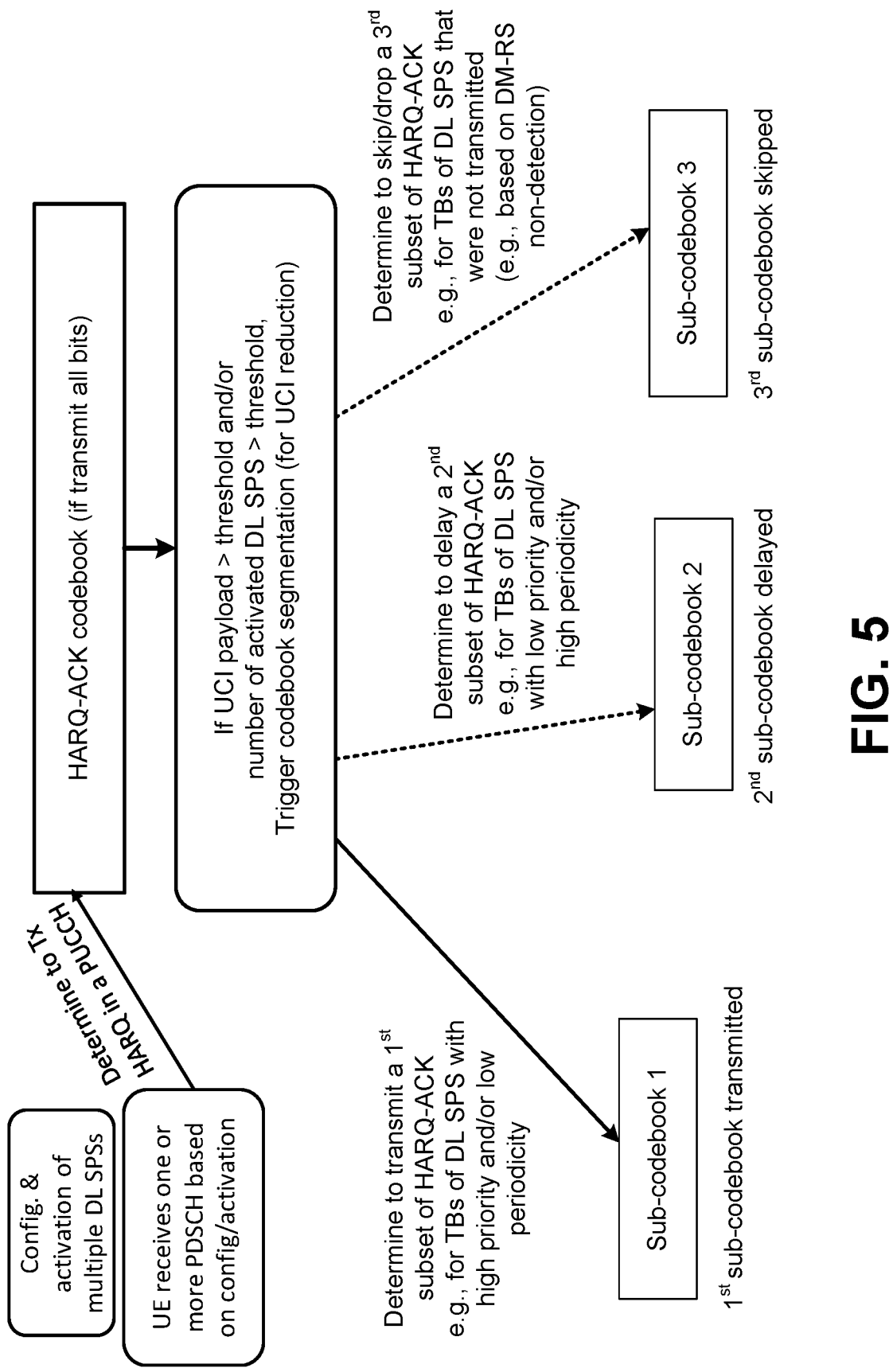
FIG. 5 is a block diagram illustrating an example of a HARQ feedback reduction mechanism for multiple downlink semi-persistent scheduling (SPS) configurations, according to one or more embodiments.

Referring to FIG. 5, in an example, a WTRU is configured with multiple DL SPS configurations, including a set of DL SPS configurations (e.g., a subset of the multiple DL SPS configurations) being activated. The WTRU may determine that the UCI payload is above a pre-configured threshold and/or the number of activated DL SPS (or the set of DL SPS configurations) is above a pre-configured threshold. The WTRU then triggers HARQ codebook segmentation. As shown in FIG. 5, for a first sub-codebook, the WTRU may determine to transmit a first subset of HARQ-ACK, for example, HARQ-ACK for TBs of DL SPS(s) with high priority and/or low periodicity. For a second sub-codebook, the WTRU may determine to delay a second subset of HARQ-ACK, for example, HARQ-ACK for TBs of DL SPS(s) with low priority and/or high periodicity. For a third sub-codebook, the WTRU may determine to skip/drop a third subset of HARQ-ACK, for example, HARQ-ACK for TBs of DL SPS(s) that were not transmitted or skipped (e.g., based on condition that DM-RS is not detected).

Representative Procedures for HA RQ Feedback Overhead Reduction

In various embodiments, method, apparatus, and/or systems for uplink control enhancement (e.g., feedback overhead reduction) in wireless communications are disclosed. In one embodiment, a method (e.g., implemented in WTRU 102) for wireless communications includes determining, by a WTRU (e.g., WTRU 102), that at least one trigger for performing feedback overhead reduction has been satisfied, and performing, by the WTRU, feedback overhead reduction. In various embodiments, the method may comprise performing feedback overhead reduction which includes compressing, skipping, splitting, and/or delaying transmission of uplink control information (UCI) and/or one or more HARQ feedback bits.

In various embodiments, the trigger (or triggering condition) discussed herein may comprise any of: 1) a HARQ codebook, an UCI payload, or a feedback overhead being above a pre-configured threshold; 2) a number of activated DL SPS transmissions (or activated DL SPS configurations) being above a configured threshold; and/or 3) one or more time-division duplexing (TDD) configurations.

In various embodiments, the trigger (or triggering condition) discussed herein may comprise any of: 1) one or more allocated resources for PUCCH transmission(s) for a HARQ codebook or UCI transmission(s); 2) one or more allocated resources for PUSCH transmission(s) for the HARQ codebook or UCI transmission(s); and/or 3) receiving an indication/message from a network (e.g., a Base Station 114, an eNode-B 160, or a gNB 180)

In various embodiments, the trigger (or triggering condition) discussed herein may comprise any of: 1) receiving a bandwidth part (BWP) configuration; 2) receiving a BWP activation message; 3) receiving a BWP switch command; and/or 4) receiving a Physical Downlink Shared Channel (PDSCH) associated with a different BWP than a currently active BWP.

In various embodiments, the trigger (or triggering condition) discussed herein may comprise any of: 1) determining that the WTRU is reporting HARQ feedback on one or more pre-configured component carriers (CCs); or 2) channel conditions reaching a pre-determined level or one or more criteria; or 3) determining that at least one PDSCH or a HARQ-ACK bit meets a feedback reduction criterion; or 4) determining that the WTRU has an ongoing L2 or L3 procedure.

In various embodiments, the method may include compressing the UCI or the HARQ feedback and calculating a logical "AND" operation of all (or a subset) of HARQ feedback bits that belong to a HARQ codebook having a size of N bits. In various embodiments, the method may include skipping one or more HARQ feedback bits of scheduled PDSCH or DM-RS transmissions. In various embodiments, the method may include delaying transmission of HARQ-ACK feedback for a subset of HARQ processes. In various embodiments, when delaying the UCI or the HARQ feedback, the method may further comprise transmitting the HARQ-ACK feedback in a different slot, sub-slot, and/or a different PUCCH Resource Indication (PRI).

In various embodiments, the method may include performing feedback overhead reduction including selecting one or more HARQ feedback bits for which feedback overhead reduction is to be applied.

In various embodiments, a method (e.g., implemented in WTRU 102) for wireless communications may comprise receiving information related to a set of downlink SPS configurations, receiving one or more downlink SPS transmissions based on the received information. The method may also comprise determining a payload of UCI for a transmission over an uplink channel, and the payload comprises a set of HARQ feedback bits based on the received information, determining that at least a triggering condition for segmenting the set of HARQ feedback bits is satisfied, determining at least a portion of the set of HARQ feedback bits based on at least a downlink SPS configuration of the set of downlink SPS configurations, and the portion of the set of HARQ feedback bits corresponds to a portion of the received one or more downlink SPS transmissions. The method may further comprise transmitting at least the portion of the set of HARQ feedback bits using the uplink channel.

In various embodiments, the received information (e.g., received via DCI or RRC signaling) may comprise an indication to activate one or more downlink SPS transmissions (and/or downlink SPS configurations) using at least the downlink SPS configuration of the set of downlink SPS configurations.

In various embodiments, the triggering condition (or trigger) (e.g., for segmenting a set of HARQ feedback bits) discussed herein may comprise any of: 1) determining that a size (e.g., a size of N bits) of the payload of UCI is greater than or equal to a first pre-configured threshold; 2) determining that a number of the activated one or more downlink SPS transmissions is greater than or equal to a second pre-configured threshold; 3) receiving a BWP configuration; 4) receiving a BWP activation message; 5) receiving a BWP switch command; or 6) receiving a PDSCH or DM-RS transmission associated with a different BWP than a currently active BWP.

In various embodiments, a downlink SPS configuration discussed herein may indicate at least a priority or a periodicity of the activated one or more downlink SPS transmissions.

In various embodiments, the method may further comprise determining a first subset and a second subset of the set of HARQ feedback bits, wherein the first subset is associated with a first downlink SPS configuration of the set of downlink SPS configurations, the second subset is associated with a second downlink SPS configuration of the set of downlink SPS configurations, and the portion of the set of HARQ feedback bits comprises any of the first subset or the second subset.

In various embodiments, the method may further comprise determining a first priority associated with the first downlink SPS configuration, determining a second priority associated with the second downlink SPS configuration, and determining the portion of the set of HARQ feedback bits comprising any of the first subset or the second subset of the set of HARQ feedback bits based on at least the first priority and the second priority. In various embodiments, the method may further comprise determining the portion of the set of HARQ feedback bits comprising the first subset of the set of HARQ feedback bits on condition that the first priority is higher than the second priority.

In various embodiments, the method may further comprise delaying transmission of the second subset of the set of HARQ feedback bits on condition that the second priority is lower than the first priority.

In various embodiments, the method may further comprise determining a first periodicity associated with the first downlink SPS configuration, determining a second periodicity associated with the second downlink SPS configuration, and determining the portion of the set of HARQ feedback bits comprising any of the first subset or the second subset based on at least the first periodicity and the second periodicity. In various embodiments, the method may further comprise determining the portion of the set of HARQ feedback bits comprising the first subset on condition that the first periodicity is lower than the second periodicity.

In various embodiments, the method may further comprise delaying transmission of the second subset of the set of HARQ feedback bits on condition that the second periodicity is higher than the first periodicity.

In various embodiments, when delaying transmission of the second subset, the method may further comprise transmitting the second subset of the set of HARQ feedback bits in a different slot, sub-slot, and/or using a different uplink channel.

In various embodiments, the method may further comprise determining a third subset of the set of HARQ feedback bits, and the third subset dose not correspond to any one of the received one or more downlink SPS transmissions. For example, the third subset of HARQ feedback bits may correspond to un-detected DL SPS transmissions such as PDSCH(s) or DM-RS(s). The method may further comprise skipping transmission of the third subset of the set of HARQ feedback bits (e.g., not transmit using allocated uplink control channel resources).

In various embodiments, the uplink channel discussed herein may be a Physical Uplink Control Channel (PUCCH) or a Physical Uplink Shared Channel (PUCCH). In various embodiments, the one or more downlink SPS transmissions discussed herein may comprise at least a Physical Downlink Shared Channel (PDSCH) transmission or a Demodulation Reference Signal (DM-RS) transmission.

In various embodiments, the method may further comprise transmitting, using the portion of the set of HARQ feedback bits, an indication indicating that transmission of another portion of the set of HARQ feedback bits is delayed or skipped. In various embodiments, the method may further comprise transmitting, using an extension bit, an indication indicating that transmission of another portion of the set of HARQ feedback bits is delayed or skipped.

In various embodiments, a method (e.g., implemented in WTRU 102) for wireless communications may comprise receiving one or more downlink SPS transmissions, determining a respective HARQ process ID for each of the received one or more downlink SPS transmissions, determining a set of HARQ feedback bits to be compressed based on the determined HARQ process IDs, and the set of HARQ feedback bits corresponds to at least a portion of the received one or more downlink SPS transmissions, and compressing the set of HARQ feedback bits into one or more bits.

In various embodiments, a method (e.g., implemented in WTRU 102) for wireless communications may comprise receiving information related to a set of downlink SPS configurations, and receiving one or more downlink SPS transmissions based on the received information. The method may further comprise determining a payload of UCI for transmission over an uplink channel, and the payload comprises a set of HARQ feedback bits based on the received information. The method may further comprise determining that at least one triggering condition for segmenting the set of HARQ feedback bits is satisfied, and determining at least a portion of the set of HARQ feedback bits based on at least a downlink SPS configuration of the set of downlink SPS configurations, wherein the determined portion of the set of HARQ feedback bits corresponds to a respective subset of the received one or more downlink SPS transmissions. The method may further comprise transmitting at least the determined portion of the set of HARQ feedback bits using the uplink channel.

In various embodiments, the received information comprises an indication to activate one or more downlink SPS configurations of the set of downlink SPS configurations, and the activated one or more downlink SPS configurations include at least the downlink SPS configuration of the set of downlink SPS configurations. In one embodiment, each of the activated one or more downlink SPS configurations indicates at least a respective priority or a respective periodicity associated with each respective activated downlink SPS configuration.

In various embodiments, the triggering condition (or trigger) (e.g., for segmenting a set of HARQ feedback bits) discussed herein may comprise any of: 1) a determination that a size of the payload of UCI is greater than or equal to a first pre-configured threshold; or 2) a determination that a number of the activated one or more downlink SPS configurations is greater than or equal to a second pre-configured threshold.

In various embodiments, the method may further comprise determining a first subset of HARQ feedback bits and a second subset of HARQ feedback bits of the set of HARQ feedback bits, the first subset is associated with the first downlink SPS configuration, the second subset is associated with a second downlink SPS configuration of the set of downlink SPS configurations, and the determined portion of the set of HARQ feedback bits includes any of the first subset of HARQ feedback bits or the second subset of HARQ feedback bits.

In various embodiments, the method may further comprise determining a first priority associated with the first downlink SPS configuration, determining a second priority associated with the second downlink SPS configuration, and selecting the first subset of HARQ feedback bits or the second subset of HARQ feedback bits to be included in the determined portion of the set of HARQ feedback bits based on any of the first priority or the second priority. In one embodiment, the method may further comprise selecting the first subset of HARQ feedback bits to be included in the determined portion of the set of HARQ feedback bits on condition that the first priority is higher than the second priority. In another embodiment, the method may further comprise transmitting the second subset of HARQ feedback bits in a subsequent transmission opportunity or using a different uplink channel on condition that the second priority is lower than the first priority.

In various embodiments, the method may further comprise determining a first periodicity associated with the first downlink SPS configuration, determining a second periodicity associated with the second downlink SPS configuration, and selecting the first subset of HARQ feedback bits or the second subset of HARQ feedback bits to be included in the determined portion of the set of HARQ feedback bits based on any of the first periodicity or the second periodicity. In one embodiment, the method may further comprise selecting the first subset of HARQ feedback bits to be included in the determined portion of the set of HARQ feedback bits on condition that the first periodicity is lower than the second periodicity. In another embodiment, the method may further comprise transmitting the second subset of HARQ feedback bits in a subsequent transmission opportunity or using a different uplink channel on condition that the second periodicity is higher than the first periodicity.

In various embodiments, the method may further comprise transmitting the first subset of HARQ feedback bits and the second subset of HARQ feedback bits in any of: different slots, different sub-slots, or using different uplink channels.

In various embodiments, the method may further comprise determining a third subset of HARQ feedback bits of the set of HARQ feedback bits, the third subset of HARQ feedback bits does not correspond to any one of the received one or more downlink SPS transmissions, and selecting the third subset of HARQ feedback bits to be included in another portion of the set of HARQ feedback bits.

In various embodiments, the method may further comprise transmitting, using the determined portion of the set of HARQ feedback bits, information to indicate that transmission of another portion of the set of HARQ feedback bits is delayed or skipped. In various embodiments, the method may further comprise transmitting, using an extension bit, information to indicate that transmission of another portion of the set of HARQ feedback bits is delayed or skipped.

In various embodiments, a WTRU (e.g., WTRU 102 or a UE) for wireless communications may comprise a receiver (e.g., a transceiver 120, or a transmit/receive element 122) configured to receive (or determine) information related to a set of downlink SPS configurations, and to receive one or more downlink SPS transmissions based on the received information. The WTRU may comprise a processor (e.g., processor 118) configured to: determine a UCI payload for transmission over an uplink channel (e.g., PUCCH or PUSCH), the UCI payload comprises a set of HARQ feedback bits based on the received information; determine that at least one triggering condition for segmenting the set of HARQ feedback bits is satisfied; and determine at least a portion of the set of HARQ feedback bits based on at least a downlink SPS configuration of the set of downlink SPS configurations, the determined portion of the set of HARQ feedback bits corresponds to a respective subset of the received one or more downlink SPS transmissions. The WTRU may also comprise a transmitter (e.g., a transceiver 120, or a transmit/receive element 122) configured to transmit at least the determined portion of the set of HARQ feedback bits using the uplink channel.

In various embodiments, a WTRU (e.g., WTRU 102 or a UE) may comprise a processor (e.g., processor 118), a transceiver (e.g., transceiver 120, or a receiver and a transmitter, or a transmit/receive element 122) and memory (e.g., non-removable memory 130, and/or removable memory 132) implementing any of the methods disclosed herein. The WTRU may also comprise any of: a speaker/microphone 124, a keypad 126, a display/touchpad 128, a power source 134, a global positioning system (GPS) chipset 136, and/or other peripherals 138, among others.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of (or interchangeable with) any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU) for wireless communications, the method comprising:

receiving configuration information comprising an indication to activate one or more downlink semi-persistent scheduling (SPS) configurations of a set of downlink SPS configurations;

determining a payload size of uplink control information (UCI) for an uplink transmission, wherein the UCI indicates a set of hybrid automatic repeat request (HARQ) feedback bits associated with one or more downlink transmissions;

determining at least a portion of the set of HARQ feedback bits to be transmitted based on at least one of the payload size of the UCI being greater than or equal to a first threshold or a number of the activated downlink SPS configurations being greater than or equal to a second threshold, wherein the at least the portion of the set of HARQ feedback bits comprises a first subset of HARQ feedback bits and a second subset of HARQ feedback bits, wherein the first subset of HARQ feedback bits is associated with a first activated downlink SPS configuration and the second subset of HARQ feedback bits is associated with a second activated downlink SPS configuration, and wherein the at least the portion of the set of HARQ feedback bits corresponds to a subset of the one or more downlink transmissions;

determining a first priority associated with the first activated downlink SPS configuration and a second priority associated with the second activated downlink SPS configuration;

selecting between the first subset of HARQ feedback bits and the second subset of HARQ feedback bits to be included in the at least the portion of the set of HARQ feedback bits based on any of the first priority or the second priority; and transmitting at least the portion of the set of HARQ feedback bits using the uplink transmission.

2. The method of claim 1, further comprising activating one or more downlink SPS configurations of the set of downlink SPS configurations, wherein each of the activated one or more downlink SPS configurations indicates at least a respective priority or a respective periodicity associated with a respective activated downlink SPS configuration.

3. The method of claim 2, wherein the determining at least the portion of the set of HARQ feedback bits to be transmitted comprises:

segmenting the set of HARQ feedback bits based on at least one of the payload size of the UCI being greater than or equal to the first threshold or the number of activated downlink SPS configurations being greater than or equal to the second threshold.

4. The method of claim 3, wherein the segmenting of the set of HARQ feedback bits is further based on any of:

a reception of a bandwidth part (BWP) configuration;

a reception of a BWP activation message;

a reception of a BWP switch command; or a reception of a Physical Downlink Shared Channel (PDSCH) transmission associated with a different BWP than a currently active BWP.

5. The method of claim 1, wherein the at least the portion of the set of HARQ feedback bits includes any of the first subset of HARQ feedback bits or the second subset of HARQ feedback bits.

6. The method of claim 1, further comprising:

selecting the first subset of HARQ feedback bits to be included in the at least the portion of the set of HARQ feedback bits based on the first priority being higher than the second priority.

7. The method of claim 1, further comprising:

transmitting the second subset of HARQ feedback bits in a subsequent transmission opportunity or using a different uplink channel based on the second priority being lower than the first priority.

8. The method of claim 1, further comprising:

determining a first periodicity associated with the first activated downlink SPS configuration;

determining a second periodicity associated with the second activated downlink SPS configuration; and selecting between the first subset of HARQ feedback bits and the second subset of HARQ feedback bits to be included in the at least the portion of the set of HARQ feedback bits based on any of the first periodicity or the second periodicity.

9. The method of claim 8, further comprising:

selecting the first subset of HARQ feedback bits to be included in the at least the portion of the set of HARQ feedback bits based on the first periodicity being lower than the second periodicity.

10. The method of claim 8, further comprising:

transmitting the second subset of HARQ feedback bits in a subsequent transmission opportunity or using a different uplink channel based on the second periodicity being higher than the first periodicity.

11. The method of claim 1, further comprising:

transmitting the first subset of HARQ feedback bits and the second subset of HARQ feedback bits in any of: different slots, different sub-slots, or using different uplink channels.

12. The method of claim 1, further comprising:

determining a third subset of HARQ feedback bits of the set of HARQ feedback bits, wherein the third subset of HARQ feedback bits does not correspond to any one of the one or more downlink transmissions; and selecting the third subset of HARQ feedback bits to be included in another portion of the set of HARQ feedback bits.

13. The method of claim 1, wherein the uplink transmission is a Physical Uplink Control Channel (PUCCH) transmission or a Physical Uplink Shared Channel (PUSCH) transmission, and wherein the one or more downlink transmissions comprise at least a Physical Downlink Shared Channel (PDSCH) transmission or a Demodulation Reference Signal (DM-RS) transmission.

14. The method of claim 1, further comprising:

transmitting, using the at least the portion of the set of HARQ feedback bits, information to indicate that transmission of another portion of the set of HARQ feedback bits is delayed or skipped.

15. The method of claim 1, further comprising:

transmitting, using an extension bit, information to indicate that transmission of another portion of the set of HARQ feedback bits is delayed or skipped.

16. A wireless transmit/receive unit (WTRU) for wireless communications, the WTRU comprising:

a receiver configured to receive configuration information comprising an indication to activate one or more downlink semi-persistent scheduling (SPS) configurations of a set of downlink SPS configurations;

a processor configured to:

determine a payload size of uplink control information (UCI) for an uplink transmission, wherein the UCI indicates a set of hybrid automatic repeat request (HARQ) feedback bits associated with one or more downlink transmissions, determine at least a portion of the set of HARQ feedback bits to be transmitted based on at least one of the payload size of the UCI being greater than or equal to a first threshold or a number of the activated downlink SPS configurations being greater than or equal to a second threshold, wherein the at least the portion of the set of HARQ feedback bits comprises a first subset of HARQ feedback bits and a second subset of HARQ feedback bits, wherein the first subset of HARQ feedback bits is associated with a first activated downlink SPS configuration and the second subset of HARQ feedback bits is associated with a second activated downlink SPS configuration, and wherein the at least portion of the set of HARQ feedback corresponds to a subset of the one or more downlink transmissions, determine a first priority associated with the first activated downlink SPS configuration and a second priority associated with the second activated downlink SPS configuration, and select between the first subset of HARQ feedback bits and the second subset of HARQ feedback bits to be included in the at least the portion of the set of HARQ feedback bits based on any of the first priority or the second priority; and a transmitter configured to transmit at least the portion of the set of HARQ feedback bits using the uplink transmission.

17. The WTRU of claim 16, wherein the processor is further configured to segment the set of HARQ feedback bits based on at least one of the payload size of the UCI being greater than or equal to the first threshold or the number of activated downlink SPS configurations being greater than or equal to the second threshold.

18. The WTRU of claim 16, wherein the processor is further configured to at least:

select the first subset of HARQ feedback bits to be included in the at least the portion of the set of HARQ feedback bits based on the first priority being higher than the second priority; or transmit the second subset of HARQ feedback bits in a subsequent transmission opportunity or using a different uplink channel based on the second priority being lower than the first priority.

19. The WTRU of claim 16, wherein the processor is further configured to:

determine a first periodicity associated with the first activated downlink SPS configuration;

determine a second periodicity associated with the second activated downlink SPS configuration; and select between the first subset of HARQ feedback bits and the second subset of HARQ feedback bits to be included in the at least the portion of the set of HARQ feedback bits based on any of the first periodicity or the second periodicity.

20. The WTRU of claim 19, wherein the processor is further configured to:

select the first subset of HARQ feedback bits to be included in the at least the portion of the set of HARQ feedback bits based on the first periodicity being lower than the second periodicity; or transmit the second subset of HARQ feedback bits in a subsequent transmission opportunity or using a different uplink channel based on the second periodicity being higher than the first periodicity.

* * * * *